United States Patent
Chang et al.

(10) Patent No.: US 9,727,120 B2
(45) Date of Patent: Aug. 8, 2017

(54) DATA COMPRESSION SYSTEM FOR LIQUID CRYSTAL DISPLAY AND RELATED POWER SAVING METHOD

(71) Applicant: NOVATEK Microelectronics Corp., Hsin-Chu (TW)

(72) Inventors: Kuei-Chung Chang, Hsinchu County (TW); Feng-Jung Kuo, Hsinchu County (TW); Hsi-Chi Ho, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 107 days.

(21) Appl. No.: 14/078,490

(22) Filed: Nov. 12, 2013

(65) Prior Publication Data

US 2015/0042671 A1 Feb. 12, 2015

(30) Foreign Application Priority Data

Aug. 9, 2013 (TW) .............................. 102128708 A (51) Int. Cl.
*G06T 1/60* (2006.01)
*G06F 1/32* (2006.01)

(52) U.S. Cl.
CPC .............. *G06F 1/3265* (2013.01); *G06T 1/60* (2013.01); *Y02B 60/1242* (2013.01)

(58) Field of Classification Search
CPC .................................. G06T 1/60; G06F 1/3265
See application file for complete search history.

(56) References Cited

U.S. PATENT DOCUMENTS

| | | | | |
|---|---|---|---|---|
| 6,145,069 A | * | 11/2000 | Dye | H03M 7/30 345/501 |
| 6,611,919 B1 | * | 8/2003 | Matsuya et al. | 713/320 |
| 2007/0110155 A1 | * | 5/2007 | Sung | H04N 19/51 375/240.13 |
| 2007/0265031 A1 | * | 11/2007 | Koizumi et al. | 455/556.1 |

(Continued)

FOREIGN PATENT DOCUMENTS

| CN | 101154373 A | 4/2008 |
|---|---|---|
| CN | 101727839 A | 6/2010 |

(Continued)

*Primary Examiner* — Jacinta M Crawford
(74) *Attorney, Agent, or Firm* — Winston Hsu (57) ABSTRACT

A data compression system for a liquid crystal display (LCD) includes a host and a drive circuit. The host is utilized for outputting image data in a first data format or a second data format according to an operation mode of the LCD. The drive circuit includes a bypass path, for transmitting the image data according to the operation mode; a compression unit, coupled to the host, for receiving the image data and performing a compression procedure on the image data to generate a compression data according to the operation mode; a storage unit, coupled to the compression unit, for storing the compression data and the image data; a de-compression unit, coupled to the storage unit, for receiving the compression data and performing a de-compression procedure on the compression data to recover the image data according to the operation mode; and a display unit, for displaying the image data.

39 Claims, 9 Drawing Sheets

(56) References Cited

U.S. PATENT DOCUMENTS

| | | | |
|---|---|---|---|
| 2008/0158375 A1* | 7/2008 | Kakkori | G06T 1/20 |
| | | | 348/222.1 |
| 2009/0087114 A1* | 4/2009 | Porter | 382/252 |
| 2009/0092325 A1* | 4/2009 | Brown Elliott et al. | 382/232 |
| 2010/0053183 A1 | 3/2010 | Park | |
| 2012/0062554 A1* | 3/2012 | Ueno et al. | 345/419 |

FOREIGN PATENT DOCUMENTS

| | | |
|---|---|---|
| CN | 101924950 A | 12/2010 |
| JP | 2011203290 A | 10/2011 |
| TW | I227455 | 2/2005 |
| TW | I240220 | 9/2005 |
| TW | 201008285 | 2/2010 |

* cited by examiner

FIG. 1

| Pixel 1 | | | | | | | | | | | | | | | | | | | | | | | | Pixel 2 | | | ... |
|---|---|---|---|---|---|---|---|---|---|---|---|---|---|---|---|---|---|---|---|---|---|---|---|---|---|---|---|
| R7 | R6 | R5 | R4 | R3 | R2 | R1 | R0 | G7 | G6 | G5 | G4 | G3 | G2 | G1 | G0 | B7 | B6 | B5 | B4 | B3 | B2 | B1 | B0 | R7 | R6 | R5 | ... |

FIG. 2A

| Pixel 1 | Pixel 2 | Pixel 3 | Pixel 4 | ... |
|---|---|---|---|---|
| R7 G7 B7 | R7 G7 B7 | R7 G7 B7 | R7 G7 B7 | ... |

FIG. 2B

| Pixel 1~n | | | | | | | | Pixel n | | | | | | | | Pixel n~m | | | | | | | | ... |
|---|---|---|---|---|---|---|---|---|---|---|---|---|---|---|---|---|---|---|---|---|---|---|---|---|
| d7 | d6 | d5 | d4 | d3 | d2 | d1 | d0 | d7 | d6 | d5 | d4 | d3 | d2 | d1 | d0 | d7 | d6 | d5 | d4 | d3 | d2 | d1 | d0 | ... |

DATA COMPRESSION SYSTEM FOR LIQUID CRYSTAL DISPLAY AND RELATED POWER SAVING METHOD

BACKGROUND OF THE INVENTION

1. Field of the Invention

The present invention relates to a data compression system for a liquid crystal display (LCD), and more particularly, to a data compression system and related power saving method capable of selecting a data transmission path according to an operation mode.

2. Description of the Prior Art

The liquid crystal display (LCD), which has advantages of thin appearance, low power saving and low radiation, etc. has widely been applied in various electronic products such as a computer screen, mobile telephone, personal digital assistant (PDA), flat television, and other communication/entertainment equipment. The principle of LCD is to vary the arrangement of liquid crystal molecules in a liquid crystal layer by varying the voltage difference between two terminals of the liquid crystal layer. The transparency of the liquid crystal layer may change accordingly, which is further incorporated with the light source provided by a backlight module to display images.

The LCD includes a drive chip. After data is transmitted from a host to the drive chip, the data may be compressed by a compression circuit and stored in a compression memory. The drive chip then utilizes a de-compression circuit to transmit the data to the display area. When the drive chip is operated in some particular modes, information related to complete color gamut may not be required. Thus, compressing the information data of complete color gamut via the compression circuit may generate unnecessary power consumption.

SUMMARY OF THE INVENTION

It is therefore an objective of the present invention to provide a data compression system for a liquid crystal display (LCD), in order to reduce power consumption of the LCD.

The present invention discloses a data compression system for an LCD. The data compression system comprises a host and a drive circuit. The host is utilized for outputting image data in a first data format or a second data format according to an operation mode of the LCD. The drive circuit comprises a bypass path, for transmitting the image data according to the operation mode; a compression unit, coupled to the host, for receiving the image data and performing a compression procedure on the image data to generate a compression data according to the operation mode; a storage unit, coupled to the compression unit, for storing the compression data and the image data; a de-compression unit, coupled to the storage unit, for receiving the compression data and performing a de-compression procedure on the compression data to recover the image data according to the operation mode; and a display unit, for displaying the image data.

The present invention further discloses a data compression system for an LCD. The data compression system comprises a host and a drive circuit. The host is utilized for outputting image data having a first data format. The drive circuit comprises a bypass path, for transmitting the image data according to an operation mode; a compression unit, coupled to the host, for receiving the image data and performing a compression procedure on the image data to generate a compression data according to the operation mode; a storage unit, coupled to the compression unit, for storing the compression data and the image data; a format conversion unit, coupled to the storage unit, for performing a format conversion procedure to convert the image data into the first data format or a second data format; a de-compression unit, coupled to the storage unit, for receiving the compression data and performing a de-compression procedure on the compression data to recover the image data according to the operation mode; and a display unit, for displaying the image data.

The present invention further discloses a power saving method for a data compression system. The power saving method comprises outputting an image data in a first data format or a second data format according to an operation mode; determining whether to perform a compression procedure on the image data according to the operation mode; and displaying the image data.

The present invention further discloses a power saving method for a data compression system. The power saving method comprises outputting an image data, the image data having a first data format; determining whether to perform a compression procedure on the image data according to an operation mode; performing a format conversion procedure to convert the image data into the first data format or a second data format according to the operation mode; and displaying the image data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
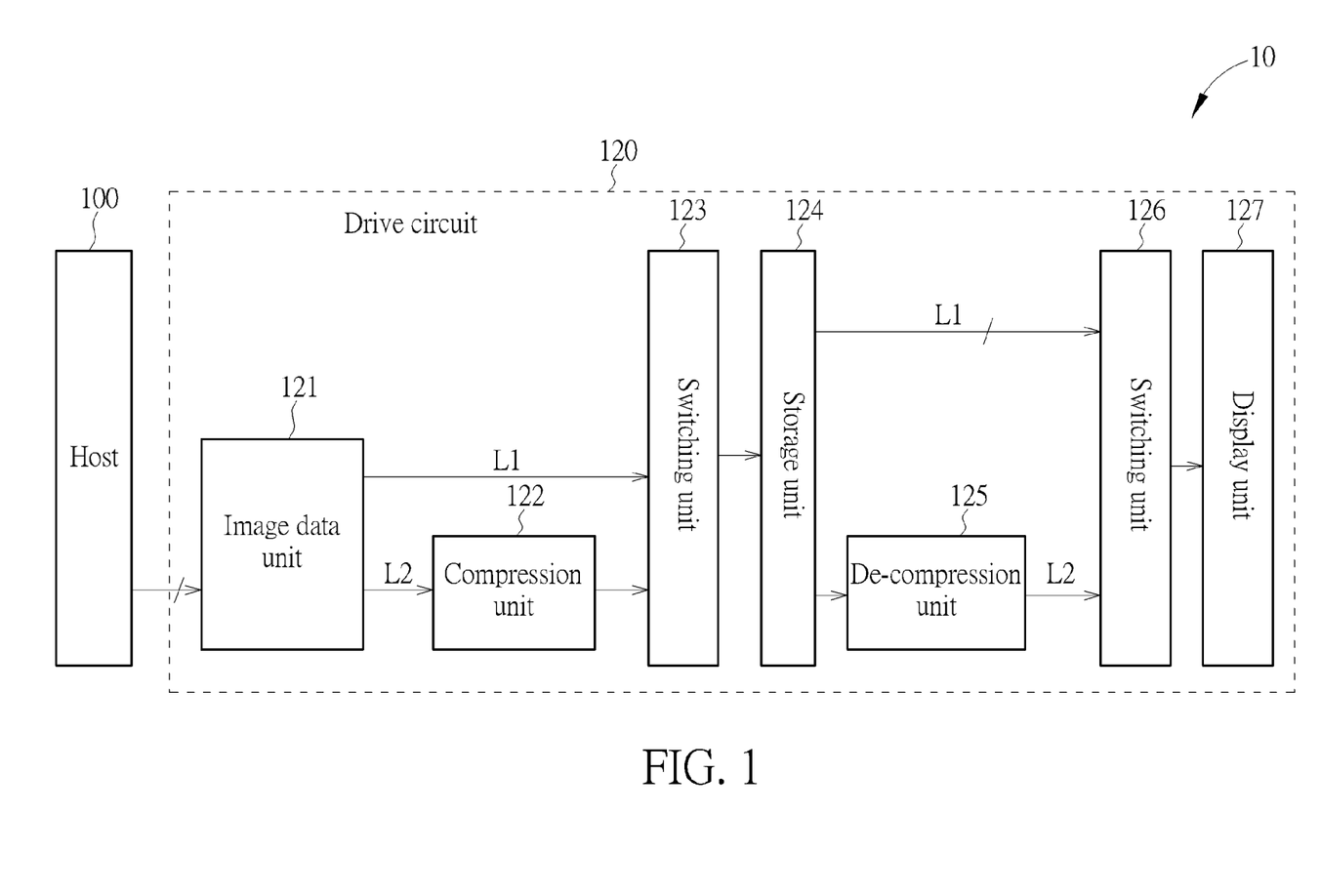
FIG. 1 is a schematic diagram of a data compression system according to an embodiment of the present invention.

Please refer to FIG. 1, which is a schematic diagram of a data compression system 10 according to an embodiment of the present invention. The data compression system 10 is utilized for a liquid crystal display (LCD). The data compression system 10 includes a host 100 and a drive circuit 120. The host 100 is utilized for outputting image data Img_D in a data format frmt1 or a data format frmt2 according to an operation mode of the LCD. Preferably, the drive circuit 120 may be realized by a drive integrated circuit (IC). The drive circuit 120 includes an image data unit 121, a compression unit 122, switching units 123 and 126, a storage unit 124, a de-compression unit 125, a display unit 127, a bypass path L1 and a complete data path L2. The switching units 123 and 126 are utilized for switching between the bypass path L1 and the complete data path L2. The compression unit 122 is utilized for receiving the image data Img_D and performing a compression procedure on the image data Img_D according to the operation mode to generate a compression data Cmprs_D. The storage unit 124, coupled to the compression unit 122 and the host 100, is utilized for storing the compression data Cmprs_D and the image data Img_D. The storage unit 124 may preferably be a static random access memory (SRAM). The de-compression unit 125, coupled to the storage unit 124, is utilized for receiving the compression data Cmprs_D and performing a de-compression procedure on the compression data Cmprs_D to recover the image data Img_D according to the operation mode. The display unit 127 is utilized for displaying the image data Img_D.

When the operation mode is a particular mode, the host 100 outputs the image data Img_D in a data format frmt1, and transmits the image data Img_D in the data format frmt1 via the bypass path L1. When the operation mode is a general mode, the host 100 outputs the image data Img_D in a data format frmt2, and transmits the image data Img_D in the data format frmt2 via the complete data path L2. Preferably, the image data in the data format frmt1 has fewer bit numbers than the image data in the data format frmt2. In addition, the particular mode includes a color gamut reduction mode, a partial area display mode and a scale up display mode. In the particular mode, the full information of the color gamut is not necessary. For example, in the color gamut reduction mode, RGB color model may be reduced from 24 bits to 3 bits; in the partial area display mode, when the LCD is switched from 480×800 full screen display to 100×100 partial screen display, other area on the screen that does not display images may be replaced by a single color; in the scale up display mode, when the LCD is switched from 480×800 full screen display to 240×400 scale up display, only half data is required to fulfill 480×800 full screen display. Therefore, in the particular mode, the host 100 may output the image data Img_D in the data format frmt1 with smaller data quantity, reduce the data quantity required to be stored in the storage unit 124, and transmit the image data Img_D to the display unit 127 via the bypass path L1 without undergoing the compression procedure and de-compression procedure. As a result, unnecessary power consumption will be prevented.

Figure 2A:
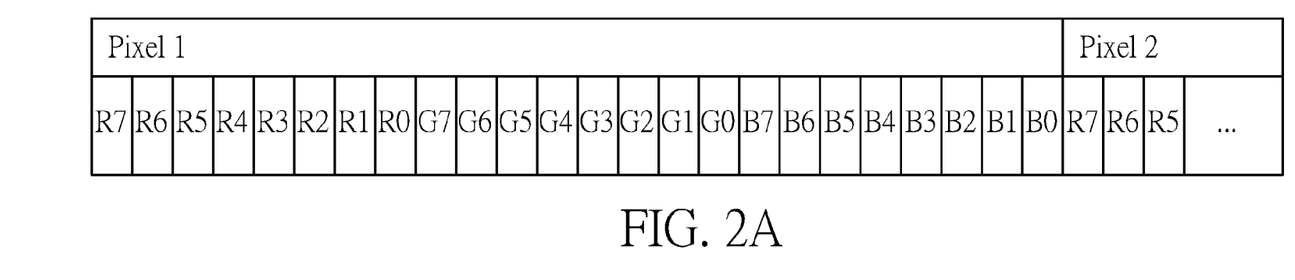
FIG. 2A and FIG. 2B are schematic diagrams of a data format according to an embodiment of the present invention.
Figure 2B:
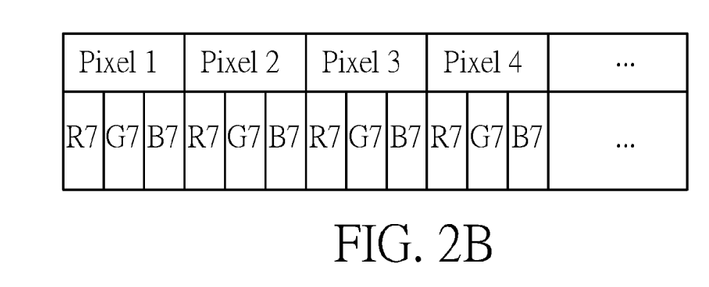
Figure 2C:
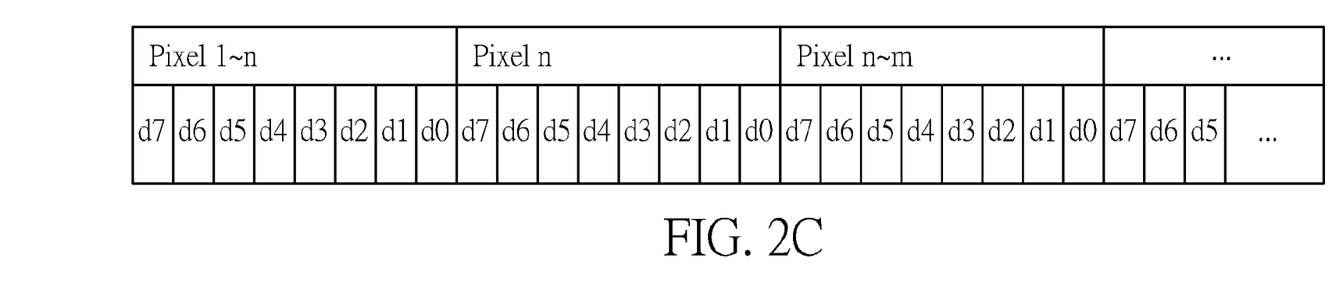
FIG. 2C is a schematic diagram of compressed data according to an embodiment of the present invention.

Please refer to FIGS. 2A, 2B and 2C. FIG. 2A is a schematic diagram of the data format frmt2 according to an embodiment of the present invention; FIG. 2B is a schematic diagram of the data format frmt1 according to an embodiment of the present invention; FIG. 2C is a schematic diagram of the compression data Cmprs_D according to an embodiment of the present invention. In FIG. 2A, each pixel includes three sub-pixels R, G, B, and each sub-pixel may be represented by 8 bits. Therefore, each pixel includes 24 bits. In FIG. 2B, each pixel only uses 3 bits to represent three sub-pixels R, G, B. In comparison, the data format frmt1 has less data quantity than the data format frmt2.

The operations of the data compression system 10 are detailed as follows. When the operation mode is the general mode, the host 100 outputs the image data Img_D in the data format frmt2. The image data Img_D in the data format frmt2 may first be passed through the image data unit 121, and then transmitted to the compression unit 122 via the complete data path L2. The compression unit 122 performs the compression procedure on the image data Img_D in the data format frmt2 to generate the compression data Cmprs_D. The switching unit 123 selects the compression data Cmprs_D coming from the complete data path L2, and stores the compression data Cmprs_D in the storage unit 124. The de-compression unit 125 then receives the compression data Cmprs_D, and performs the de-compression procedure on the compression data Cmprs_D to recover the image data Img_D in the data format frmt2. The switching unit 126 transmits the image data Img_D in the data format frmt2 to the display unit 127 via the complete data path L2. Finally, the display unit 127 displays the image data Img_D in the data format frmt2. When the operation mode is switched from the general mode to the particular mode, the host 100 re-transmits transmitted image data Prv_D1 in the data format fmrt1 in the next image frame after the switching, where the transmitted image data Prv_D1 has been transmitted in the data format fmrt2 when the operation mode is the general mode. When the host 100 re-transmits the image data Prv_D1 in the data format fmrt1, the display unit 127 displays a black screen, in order to prevent an abnormal image from being displayed. When the operation mode is the particular mode, the host 100 outputs the image data Img_D in the data format frmt1. The image data Img_D in the data format frmt1 first is passed through the image data unit 121, and transmitted to the switching unit 123, bypassing the compression unit 122 via the bypass path L1. The switching unit 123 selects the image data Img_D in the data format frmt1 coming from the bypass path L1, and stores the image data Img_D in the data format frmt1 in the storage unit 124. The switching unit 126 then transmits the image data Img_D in the data format frmt1 to the display unit 127 via the bypass path L1. Finally, the display unit 127 displays the image data Img_D in the data format frmt1. When the operation mode is switched from the particular mode back to the general mode, the host 100 re-transmits an image data Prv_D2 in the data format fmrt2 in next image frame after the switching, and the image data Prv_D2 has been transmitted in the data format fmrt1 when the operation mode is the particular mode. When the host 100 re-transmits the image data Prv_D2 in the data format fmrt2, the display unit 127 displays a black screen, in order to prevent an abnormal image from being displayed. The operations after the operation mode returns to the general mode are illustrated above, and will not be narrated herein. Therefore, when the operation mode is the particular mode, the data compression system 10 transmits the image data Img_D in the data format fmrt1 to the display unit 127 via the bypass path L1 and omits the compression procedure and the de-compression procedure, in order to reduce power consumption.

Figure 3:
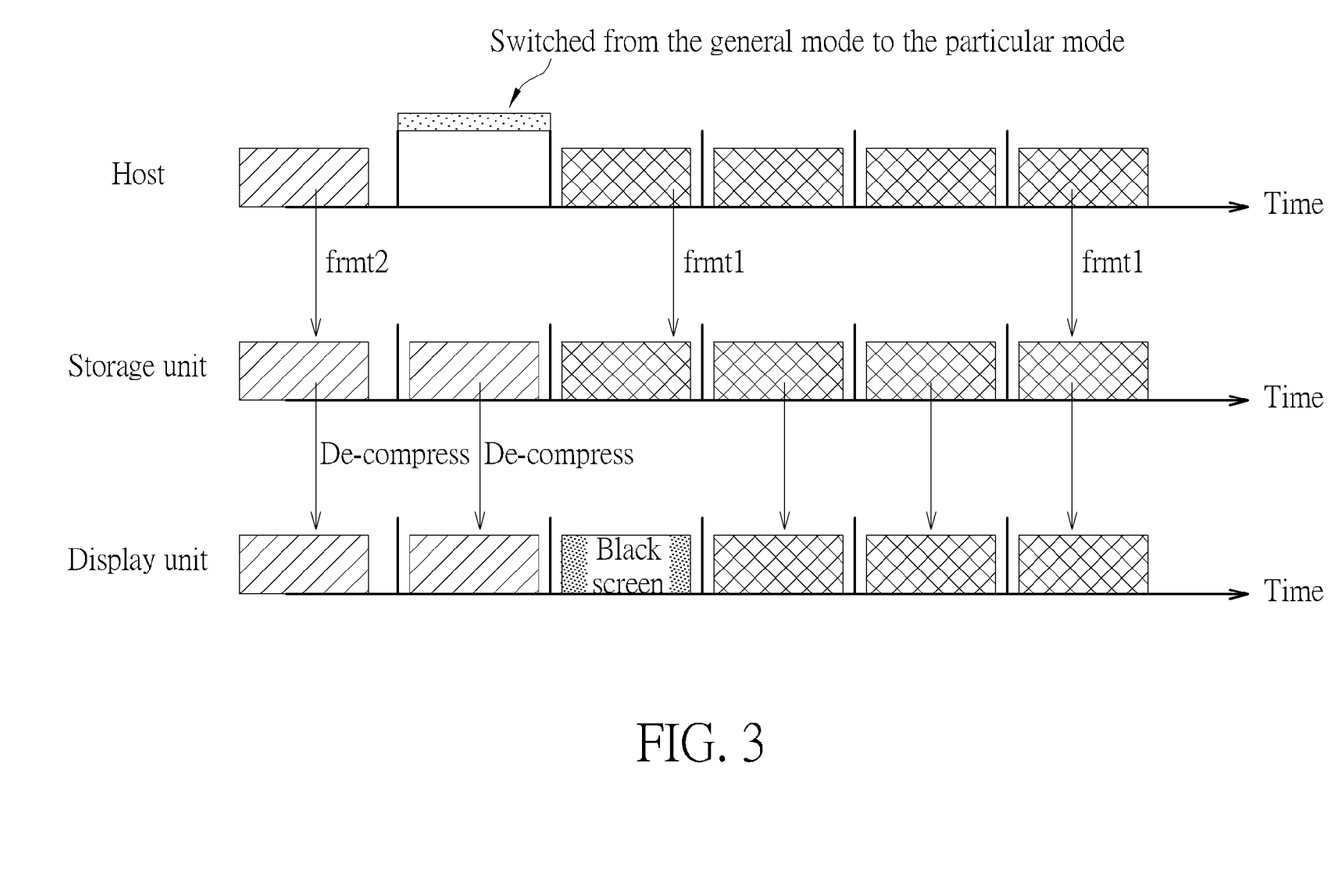
FIG. 3 and FIG. 4 are timing diagrams of image data in different output terminals according to an embodiment of the present invention.
Figure 4:
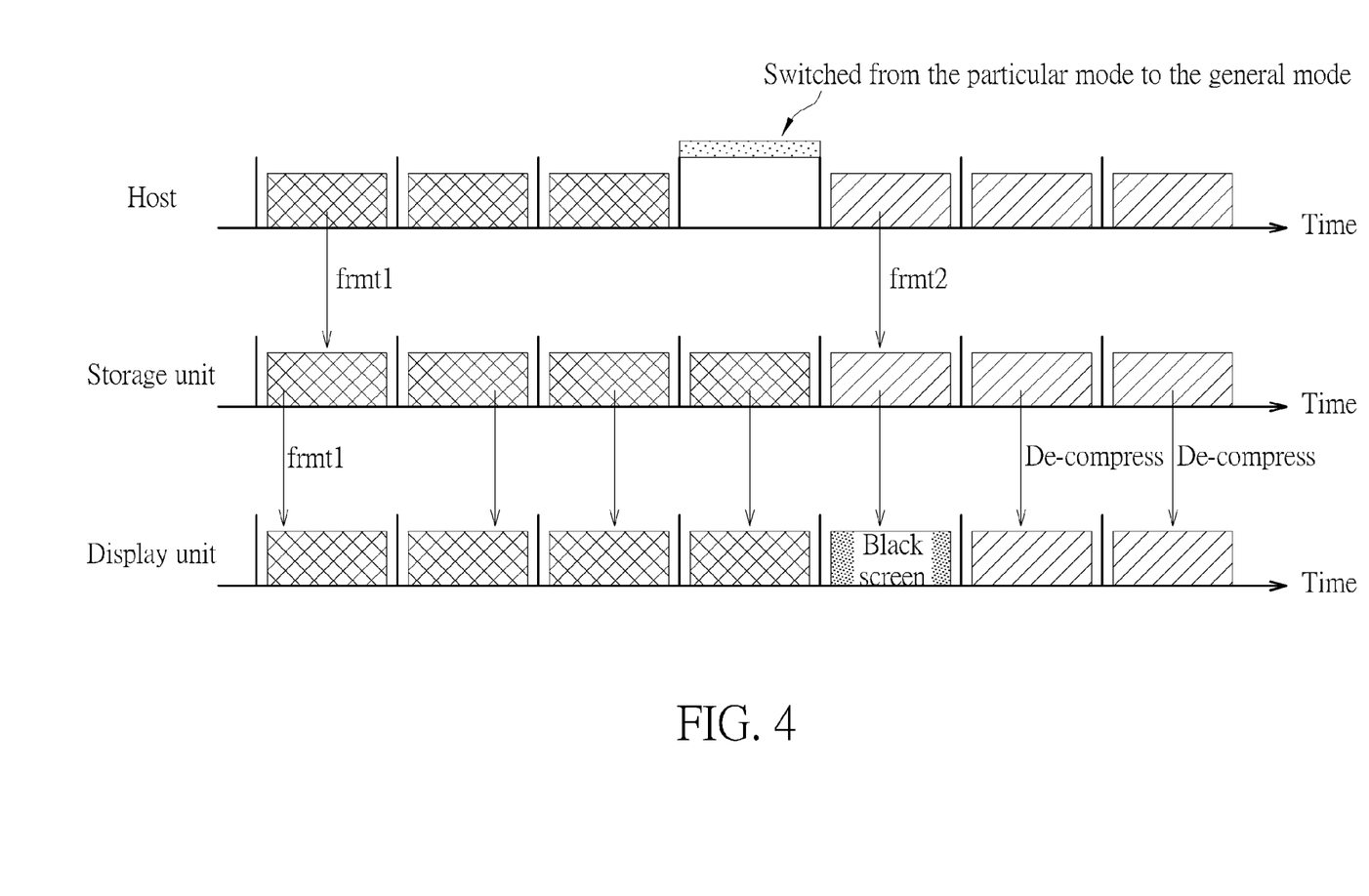

In addition, please refer to FIG. 3 and FIG. 4. FIG. 3 is a timing diagram of image data in different output terminals when the operation mode is switched from the general mode to the particular mode according to an embodiment of the present invention; FIG. 4 is a timing diagram of image data in different output terminals when the operation mode is switched from the particular mode to the general mode according to an embodiment of the present invention. In FIG. 3 and FIG. 4, the horizontal axis represents time, on which each time interval denotes a time period of an image frame. Details of FIG. 3 and FIG. 4 are illustrated above, and will not be narrated herein.

Figure 5:
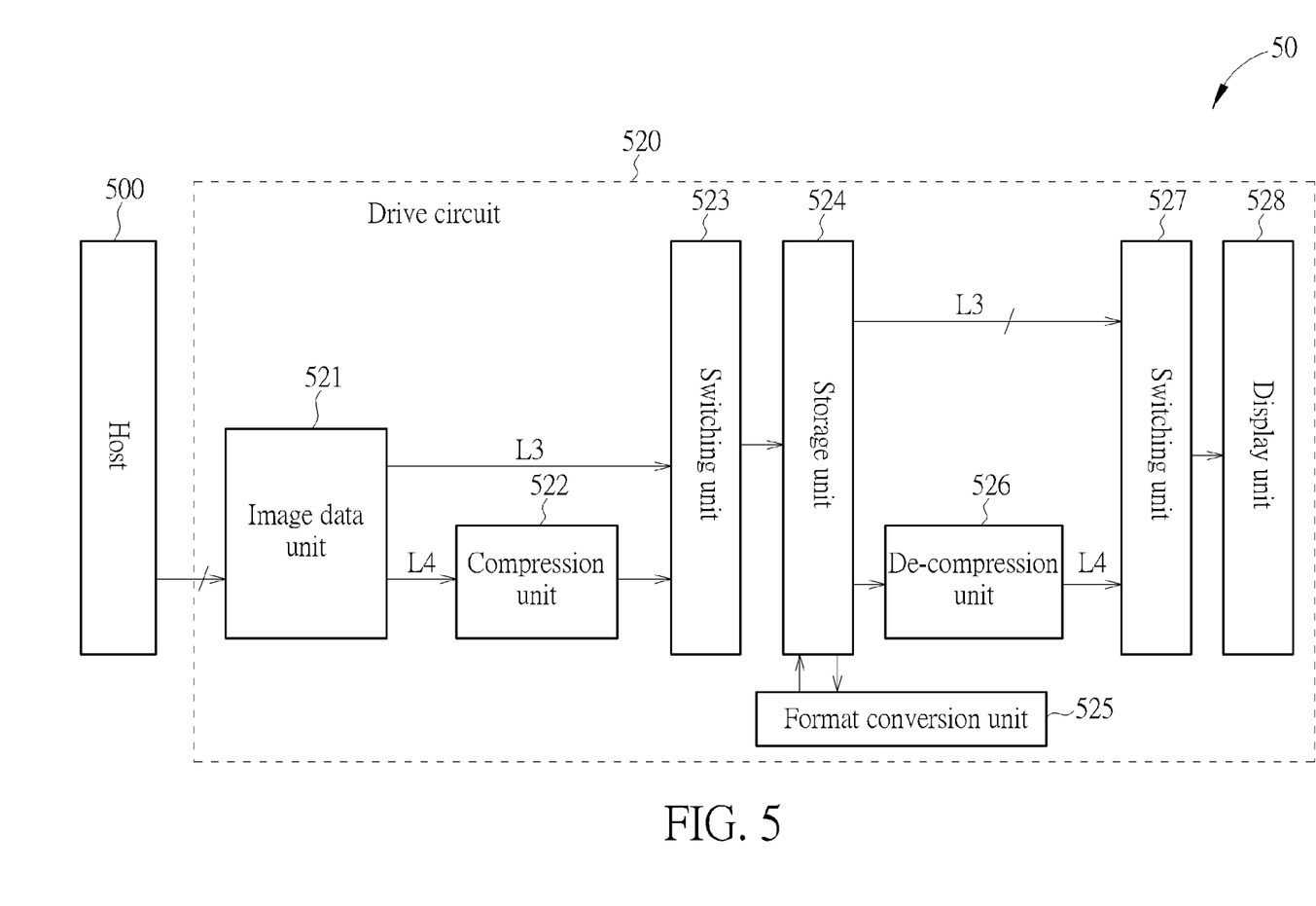
FIG. 5 is a schematic diagram of a data compression system according to another embodiment of the present invention.

Please refer to FIG. 5, which is a schematic diagram of a data compression system 50 according to another embodiment of the present invention. The data compression system 50 may be utilized in an LCD. The basic structures of the data compression system 50 are similar to those of the data compression system 10; hence data in the same output terminals are denoted by the same symbols. The data compression system 50 includes a host 500 and a drive circuit 520. The host 500 is utilized for outputting an image data Img_D, which is in a data format fmrt2. Preferably, the drive circuit 520 may be realized by a driving IC. The drive circuit 520 includes an image data unit 521, a compression unit 522, switching units 523 and 527, a storage unit 524, a format conversion unit 525, a de-compression unit 526, a display unit 528, a bypass path L3 and a complete data path L4. The switching units 523 and 527 are utilized for switching between the bypass path L3 and the complete data path L4. The compression unit 522 is utilized for receiving the image data Img_D and performing the compression procedure on the image data Img_D to generate the compression data Cmprs_D according to the operation mode. The storage unit 524, coupled to the compression unit 522 and the host 500, is utilized for storing the compression data Cmprs_D and the image data Img_D. Preferably, the storage unit 524 may be an SRAM. The format conversion unit 525, coupled to the storage unit 524, is utilized for performing a format conversion procedure to convert the image data Img_D into the data format frmt1 or the data format frmt2. The de-compression unit 526, coupled to the storage unit 524, is utilized for receiving the compression data Cmprs_D and performing the de-compression procedure on the compression data Cmprs_D to recover the image data Img_D according to the operation mode. The display unit 528 is utilized for displaying the image data Img_D.

When the operation mode is the particular mode, the image data Img_D in the data format frmt2 is transmitted to the storage unit 524 via the bypass path. The format conversion unit 525 reads the image data Img_D in the data format frmt2 from the storage unit 524, converts the image data Img_D in the data format frmt2 into the data format frmt1 with smaller amount of data, and stores the data back to the storage unit 524, where the compression procedure and the de-compression procedure are both omitted. As a result, unnecessary power consumption may be prevented.

The operations of the data compression system 50 are detailed as follows. When the operation mode is the general mode, the host 500 outputs the image data Img_D in the data format frmt2. The image data Img_D in the data format frmt2 is first passed through the image data unit 521, and transmitted to the compression unit 522 via the complete data path L4. The compression unit 522 performs the compression procedure on the image data Img_D in the data format frmt2 to generate the compression data Cmprs_D. The switching unit 523 selects the compression data Cmprs_D from the complete data path L4, and stores the compression data Cmprs_D in the storage unit 524. The de-compression unit 526 then receives the compression data Cmprs_D, and performs the de-compression procedure on the compression data Cmprs_D to recover the image data Img_D in the data format frmt2. The switching unit 527 transmits the image data Img_D in the data format frmt2 to the display unit 528 via the complete data path L4. Finally, the display unit 528 displays the image data Img_D in the data format frmt2. When the operation mode is switched from the general mode to the particular mode, the host 500 outputs the image data Img_D in the data format frmt2 to the image data unit 521, and transmits the image data Img_D in the data format frmt2 to the storage unit 524 via the bypass path L3. The format conversion unit 525 reads the image data Img_D in the data format frmt2 from the storage unit 524 in the next image frame after the switching, and converts the image data Img_D from the data format frmt2 into the data format frmt1 and then stores the image data Img_D back to the storage unit 524. When the format conversion unit 525 performs the format conversion procedure, the display unit 528 displays a black screen, in order to prevent an abnormal image from being displayed. When the format conversion procedure is accomplished, the display unit 528 may display the image data Img_D in the data format frmt1. When the operation mode is switched from the particular mode back to the general mode, the format conversion unit 525 reads the image data Img_D in the data format frmt1 from the storage unit 524 in the next image frame after the switching, and converts the image data Img_D from the data format frmt1 into the data format frmt2 and then stores the image data Img_D back to the storage unit 524. Similarly, when the format conversion unit 525 performs the format conversion procedure, the display unit 528 may display a black screen, in order to prevent an abnormal image from being displayed. When the format conversion procedure is accomplished, the display unit 528 may display the image data Img_D in the data format frmt2. The operations after the operation mode returns to the general mode are illustrated above, and will not be narrated herein. Therefore, when the operation mode is the particular mode, the data compression system 50 transmits the image data Img_D to the display unit 528 via the bypass path L3, and the compression procedure and the de-compression procedure are omitted, in order to reduce power consumption. Please note that, in comparison with the data compression system 10, in the data compression system 50 the host 500 may not need to re-transmit, and the data format conversion is performed by the format conversion unit 525.

Figure 6:
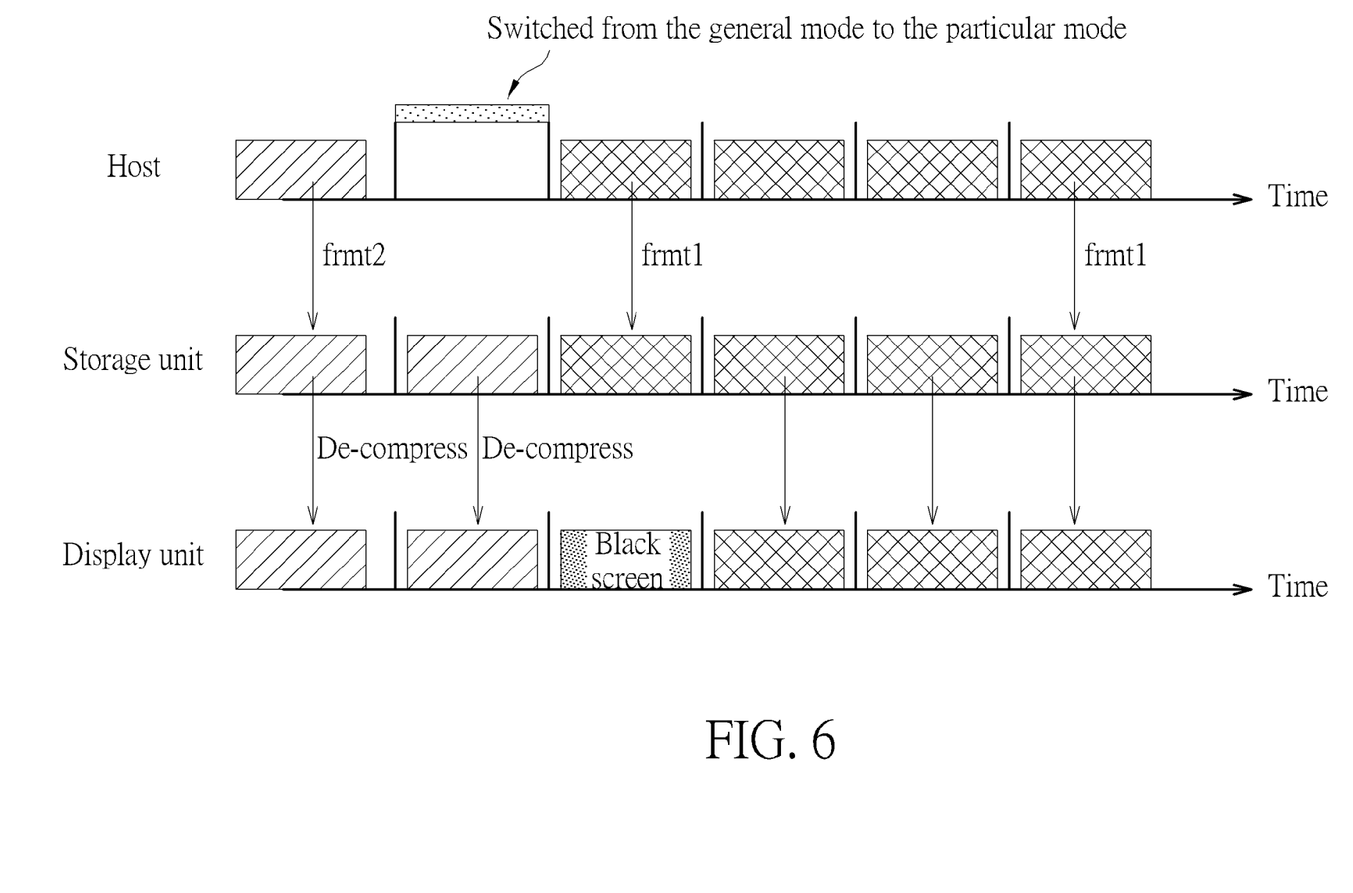
FIG. 6 and FIG. 7 are timing diagrams of image data in different output terminals according to an embodiment of the present invention.
Figure 7:
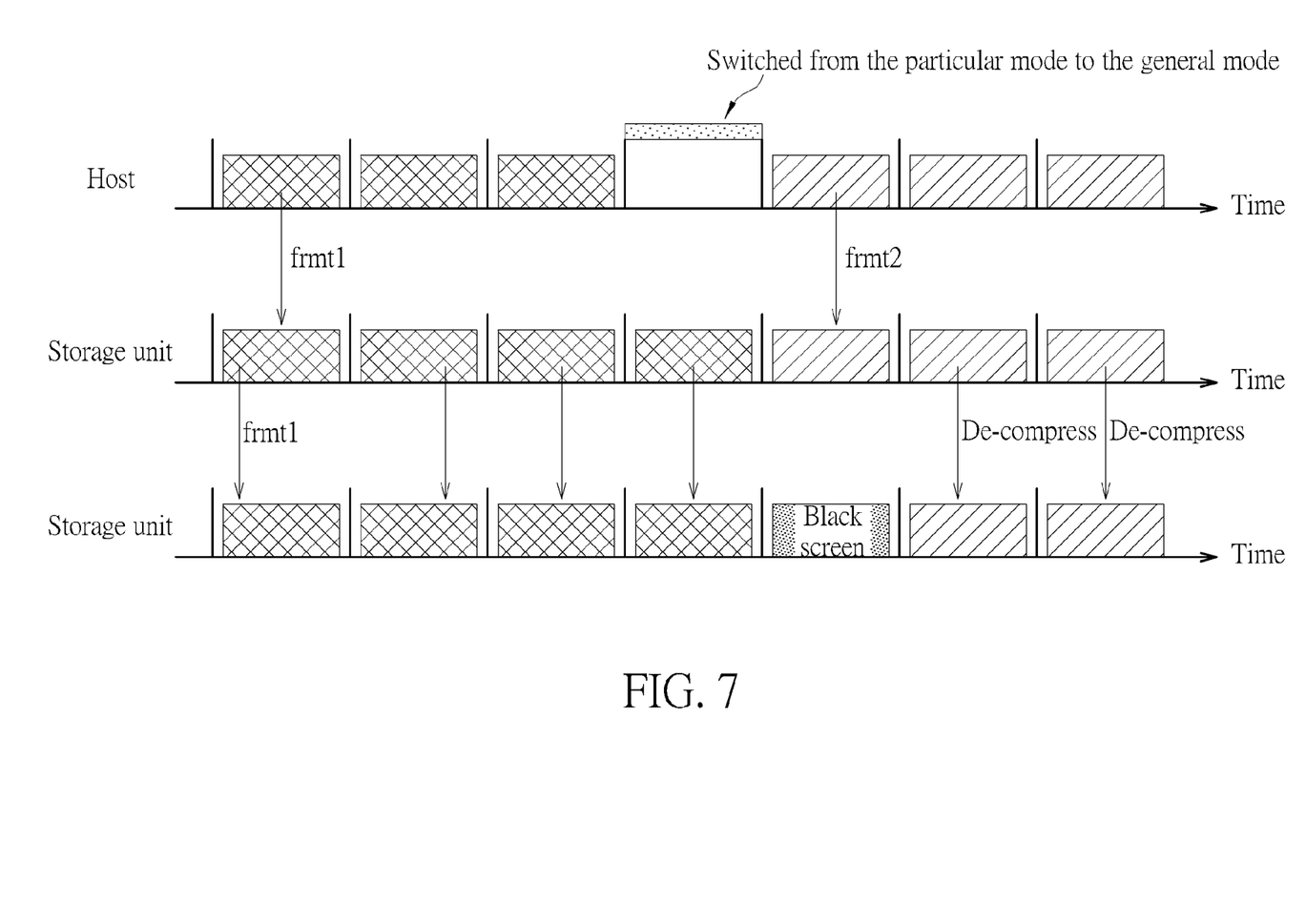

In addition, please refer to FIG. 6 and FIG. 7. FIG. 6 is a timing diagram of image data in different output terminals when the operation mode is switched from the general mode to the particular mode according to an embodiment of the present invention; FIG. 7 is a timing diagram of image data in different output terminals when the operation mode is switched from the particular mode to the general mode according to an embodiment of the present invention. In FIG. 6 and FIG. 7, the horizontal axis represents time, on which each time interval denotes a time period of an image frame. Details of FIG. 6 and FIG. 7 are illustrated above, and will not be narrated herein.

Figure 8:
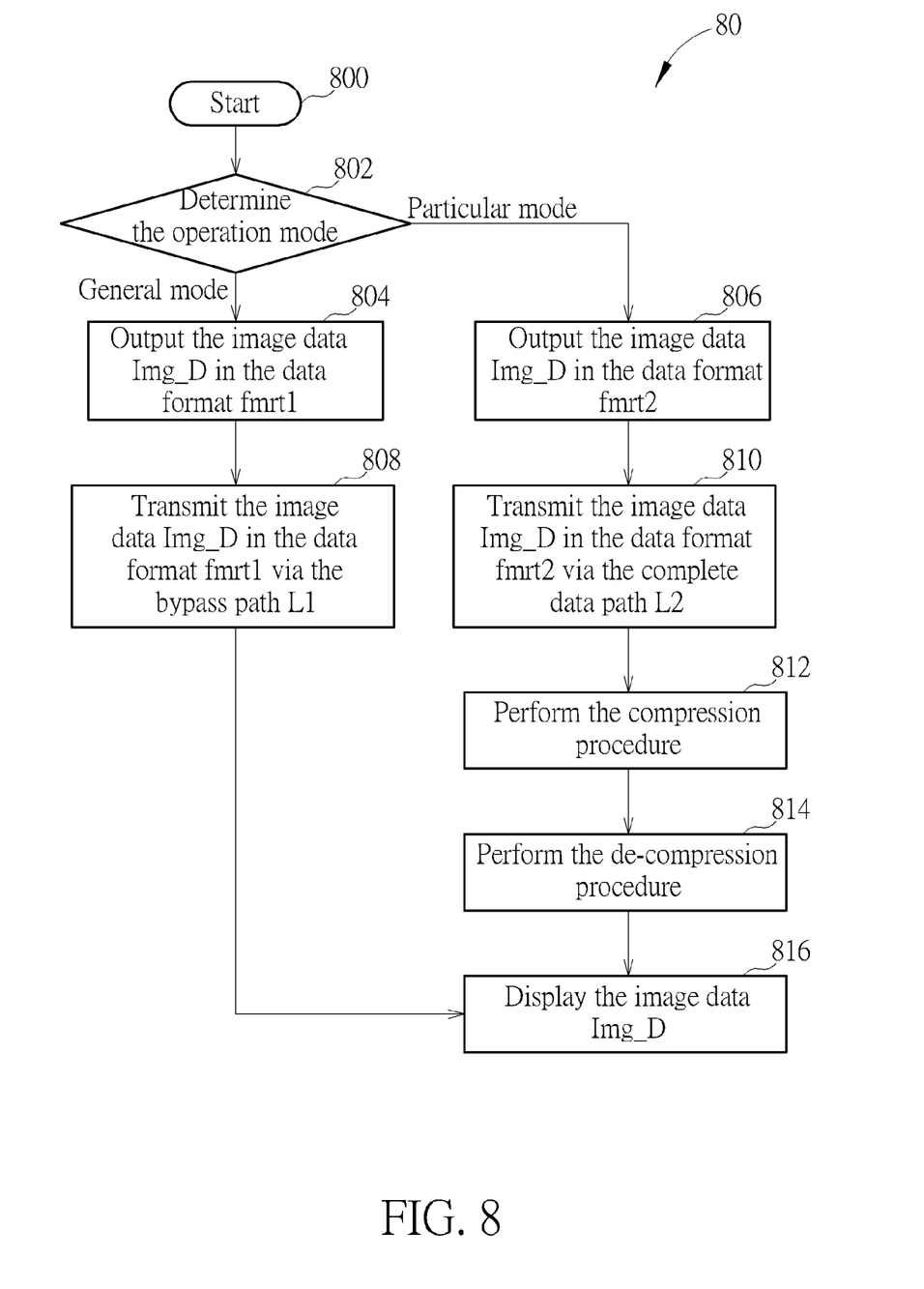
FIG. 8 is a schematic diagram of a process according to an embodiment of the present invention.

The operations related to the data compression system 10 can be summarized into a process 80, as shown in FIG. 8. The process 80, which may be utilized in the data compression system 10 for power saving, includes the following steps:

Step 800: Start.

Step 802: Determine the operation mode. If the operation mode is the general mode, go to Step 804; if the operation mode is the particular mode, go to Step 806.

Step 804: Output the image data Img_D in the data format fmrt1, and go to Step 808.

Step 806: Output the image data Img_D in the data format fmrt2, and go to Step 810.

Step 808: Transmit the image data Img_D in the data format fmrt1 via the bypass path L1, and go to Step 816.

Step 810: Transmit the image data Img_D in the data format fmrt2 via the complete data path L2.

Step 812: Perform the compression procedure.

Step 814: Perform the de-compression procedure.

Step 816: Display the image data Img_D.

According to the process 80, when the operation mode is the particular mode, the data compression system 10 transmits the image data Img_D in the data format fmrt1 via the bypass path L1 and omits the compression procedure and the de-compression procedure, in order to reduce power consumption. When the operation mode is the general mode, the data compression system 10 performs the compression procedure and the de-compression procedure on the image data Img_D in the data format fmrt2 via the complete data path L2. Detailed operations of the process 80 are illustrated above, and will not be narrated herein.

Figure 9:
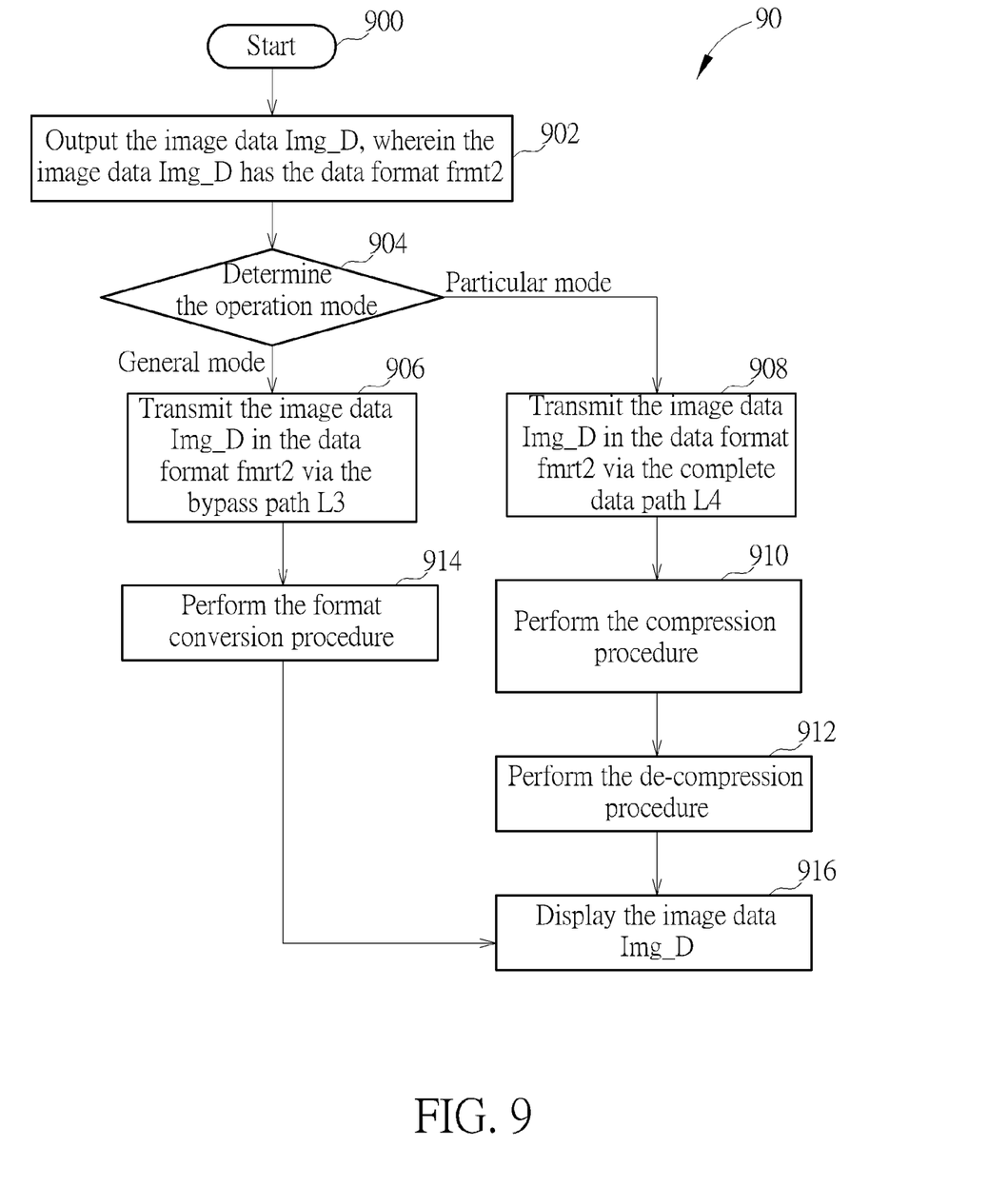
FIG. 9 is a schematic diagram of a process according to an embodiment of the present invention.

The operations related to the data compression system 50 can be summarized into a process 90, as shown in FIG. 9. The process 90, which may be utilized in the data compression system 50 for power saving, includes the following steps:

Step 900: Start.

Step 902: Output the image data Img_D, wherein the image data Img_D has the data format frmt2.

Step 904: Determine the operation mode. If the operation mode is the general mode, go to Step 906; if the operation mode is the particular mode, go to Step 908.

Step 906: Transmit the image data Img_D in the data format fmrt2 via the bypass path L3, and go to Step 914.

Step 908: Transmit the image data Img_D in the data format fmrt2 via the complete data path L4.

Step 910: Perform the compression procedure.

Step 912: Perform the de-compression procedure, and go to Step 916.

Step 914: Perform the format conversion procedure.

Step 916: Display the image data Img_D.

According to the process 90, when the operation mode is the particular mode, the data compression system 50 transmits the image data Img_D in the data format fmrt2 via the bypass path L3 and omits the compression procedure and the de-compression procedure, and performs the format conversion procedure to convert the image data Img_D from the data format fmrt2 into the data format fmrt1. When the operation mode is the general mode, the data compression system performs the compression procedure and the de-compression procedure on the image data Img_D in the data format fmrt2 via the complete data path L4. Detailed operations of the process 90 are illustrated above, and will not be narrated herein.

To sum up, an embodiment of the present invention may determine a transmitting path of the image data (the bypass path or the complete data path) according to the operation mode. When the operation mode is the particular mode without full color information (the color gamut reduction mode, the partial area display mode and the scale up display mode), an embodiment of the present invention may transmit the image data in a data format with smaller amount of data or convert the image data into a data format with smaller amount of data to transmit the image data via the bypass path, wherein the compression procedure and the de-compression procedure are omitted, in order to achieve power saving.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data compression system for a display comprising:
a host, for outputting image data in a first data format or a second data format according to an operation mode of the display, wherein the image data in the first data format has fewer bit numbers than the image data in the second data format; and
a drive circuit, comprising:
a bypass path, for transmitting the image data according to the operation mode;
a compression unit, coupled to the host, for receiving the image data and performing a compression procedure on the image data to generate a compression data according to the operation mode;
a storage unit, coupled to the compression unit, for storing the compression data and the image data;
a de-compression unit, coupled to the storage unit, for receiving the compression data and performing a de-compression procedure on the compression data to recover the image data according to the operation mode; and
a display unit, for displaying the image data;
wherein when the operation mode is a particular mode, the host outputs the image data in the first data format and the bypass path transmits the image data in the first data format to the storage unit so as to bypass the compression unit and the de-compression unit, and when the operation mode is a general mode, the host outputs the image data in the second data format and the bypass path does not transmit the image data.

2. The data compression system of claim 1, wherein the particular mode comprises a color gamut reduction mode, a partial area display mode and a scale up display mode.

3. The data compression system of claim 1, wherein the host further re-transmits transmitted image data in the first data format wherein the transmitted image data has been transmitted after the operation mode is switched from the general mode to the particular mode.

4. The data compression system of claim 3, wherein the display unit further displays a black screen when the host re-transmits the transmitted image data in the first data format.

5. The data compression system of claim 1, wherein the host further re-transmits transmitted image data in the second data format wherein the transmitted image data has been transmitted after the operation mode is switched from the particular mode to the general mode.

6. The data compression system of claim 5, wherein the display unit further displays a black screen when the host re-transmits the transmitted image data in the second data format.

7. The data compression system of claim 1, wherein the compression unit receives the image data in the second data format and performs the compression procedure on the image data in the second data format to generate the compression data when the operation mode is the general mode.

8. The data compression system of claim 1, wherein the de-compression unit receives the compression data and performs the de-compression procedure on the compression data to recover the image data in the second data format when the operation mode is the general mode.

9. The data compression system of claim 1, wherein only partial information of color gamut is comprised in the image data in the particular mode.

10. The data compression system of claim 1, wherein the compression unit receives the image data in the second data format and performs the compression procedure on the image data in the second data format to generate the compression data and provides the compression data to the storage unit, and the de-compression unit receives the compression data from the storage unit and performs the decompression procedure on the compression data to recover the image data in the second data format when the operation mode is the general mode.

11. A data compression system for a display comprising:
a host, for outputting image data, the image data having a first data format; and
a drive circuit, comprising:
a bypass path, for transmitting the image data according to an operation mode;
a compression unit, coupled to the host, for receiving the image data and performing a compression procedure on the image data to generate a compression data according to the operation mode;
a storage unit, coupled to the compression unit, for storing the compression data and the image data;
a format conversion unit, coupled to the storage unit, for performing a format conversion procedure to convert the image data into a second data format when receiving the image data which come from the bypass path and bypass the compression unit, and not performing the format conversion procedure when receiving the compression data from the compression unit;
a de-compression unit, coupled to the storage unit, for receiving the compression data and performing a de-compression procedure on the compression data to recover the image data according to the operation mode; and
a display unit, for displaying the image data;
wherein the image data in the second data format has fewer bit numbers than the image data in the first data format;
wherein when the operation mode is a particular mode, the format conversion unit converts the image data from the first data format into the second data format and the bypass path transmits the image data to the storage unit so as to bypass the compression unit and the de-compression unit, and when the operation mode is a general mode, the format conversion unit does not perform the format conversion procedure on the image data and the bypass path does not transmit the image data.

12. The data compression system of claim 11, wherein the format conversion unit converts the image data from the first data format into the second data format after the operation mode is switched from the general mode to the particular mode, and converts the image data from the second data format into the first data format after the operation mode is switched from the particular mode to the general mode.

13. The data compression system of claim 12, wherein the particular mode comprises a color gamut reduction mode, a partial area display mode and a scale up display mode.

14. The data compression system of claim 12, wherein the compression unit receives the image data and performs the compression procedure on the image data to generate the compression data when the operation mode is the general mode.

15. The data compression system of claim 12, wherein the de-compression unit receives the compression data and performs the de-compression procedure on the compression data to recover the image data when the operation mode is the general mode.

16. The data compression system of claim 12, wherein the display unit further displays a black screen when the format conversion unit performs the format conversion procedure.

17. The data compression system of claim 11, wherein the compression unit receives the image data in the first data format and performs the compression procedure on the image data in the first data format to generate the compression data and provides the compression data to the storage unit, and the de-compression unit receives the compression data from the storage unit and performs the de-compression procedure on the compression data to recover the image data in the first data format when the operation mode is the general mode.

18. A power saving method for a data compression system comprising:
receiving an image data in a first data format or a second data format from a host according to an operation mode, wherein the image data in the first data format has fewer bit numbers than the image data in the second data format;
determining whether to perform a compression procedure on the image data according to the operation mode; and
outputting to display the image data;
wherein when the operation mode is a particular mode, the received image data is in the first data format and a bypass path transmits the image data in the first data format to a storage unit so as to omit the compression procedure, and when the operation mode is a general mode, the received image data is in the second data format and the bypass path does not transmit the image data.

19. The power saving method of claim 18, wherein the particular mode comprises a color gamut reduction mode, a partial area display mode and a scale up display mode.

20. The power saving method of claim 18, further comprising storing the image data in the first data format in a memory unit.

21. The power saving method of claim 18, further comprising re-transmitting transmitted image data in the first data format wherein the transmitted image data has been transmitted after the operation mode is switched from the general mode to the particular mode.

22. The power saving method of claim 21, further comprising displaying a black screen when the host re-transmits the transmitted image data in the first data format.

23. The power saving method of claim 18, further comprising re-transmitting transmitted image data in the second data format wherein the transmitted image data has been transmitted after the operation mode is switched from the particular mode to the general mode.

24. The power saving method of claim 23, further comprising displaying a black screen when the host re-transmits the transmitted image data in the second data format.

25. The power saving method of claim 18, wherein the step of determining whether to perform the compression procedure on the image data according to the operation mode comprises:
performing the compression procedure on the image data in the second data format to generate a compression data when the operation mode is the general mode.

26. The power saving method of claim 25, further comprising:
storing the compression data in a memory unit and performing a de-compression procedure on the compression data to recover the image data in the second data format when the operation mode is the general mode.

27. The power saving method of claim 18, wherein only partial information of color gamut is comprised in the image data in the particular mode.

28. The power saving method of claim 18, wherein the compression procedure is performed on the image data in the second data format to generate a compression data to be provided to the storage unit, and the de-compression procedure is performed on the compression data to recover the image data in the second data format when the operation mode is the general mode.

29. A power saving method for a data compression system comprising:
receiving an image data from a host, the image data having a first data format;
determining whether to perform a compression procedure on the image data according to an operation mode;
performing a format conversion procedure to convert the image data into a second data format when the image data does not undergo the compression procedure according to the operation mode;
not performing the format conversion procedure on a compression data generated by the compression procedure; and
outputting to display the image data;
wherein the image data in the second data format has fewer bit numbers than the image data in the first data format;
wherein when the operation mode is a particular mode, the format conversion procedure is performed to convert the image data from the first data format into the second data format and a bypass path transmits the image data to a storage unit so as to omit the compression procedure, and when the operation mode is a general mode, the format conversion procedure is not performed on the image data and the bypass path does not transmit the image data.

30. The power saving method of claim 29, wherein the particular mode comprises a color gamut reduction mode, a partial area display mode and a scale up display mode.

31. The power saving method of claim 29, wherein the step of performing the format conversion procedure to convert the image data into the first data format or the second data format according to the operation mode comprises:
converting the image data from the first data format into the second data format after the operation mode is switched from the general mode to the particular mode, and converting the image data from the second data format into the first data format after the operation mode is switched from the particular mode to the general mode.

32. The power saving method of claim 29, further comprising storing the image data in a memory unit.

33. The power saving method of claim 29, further comprising displaying a black screen when the format conversion procedure is performed.

34. The power saving method of claim 29, wherein the step of determining whether to perform the compression procedure on the image data according to the operation mode comprises:
performing the compression procedure on the image data to generate a compression data when the operation mode is the general mode.

35. The power saving method of claim 34, further comprising:
storing the compression data in a memory unit and performing a de-compression procedure on the compression data to recover the image data when the operation mode is the general mode.

36. The power saving method of claim 29, wherein the compression procedure is performed on the image data in the first data format to generate a compression data to be provided to the storage unit, and the de-compression procedure is performed on the compression data to recover the image data in the first data format when the operation mode is the general mode.

37. A display device, comprising:
a storage unit;
a first data path, comprising a bypass path, and the storage unit coupled to the bypass path, for transmitting image data for driving a display panel when the display device operates in a first operation mode in which the image data has a first bit number;
a second data path, comprising a compression unit, the storage unit coupled to the compression unit, and a decompression unit coupled to the storage unit, for transmitting image data for driving the display panel when the display device operates in a second operation mode in which the image data has a second bit number greater than the first bit number,
wherein image data received from a host is selectively transmitted through one of the first data path and the second data path according to whether the display device operates in the first operation mode or the second operation mode.

38. A drive circuit of a data compression system for a display, for receiving image data in a first data format or a second data format from a host of the data compression system according to an operation mode of the display, the image data in the first data format having fewer bit numbers than the image data in the second data format, the drive circuit comprising:
a bypass path, for transmitting the image data according to the operation mode;
a compression unit, coupled to the host, for receiving the image data and performing a compression procedure on the image data to generate a compression data according to the operation mode;
a storage unit, coupled to the compression unit, for storing the compression data and the image data; and
a de-compression unit, coupled to the storage unit, for receiving the compression data and performing a de-compression procedure on the compression data to recover the image data according to the operation mode;
wherein when the operation mode is a particular mode, the host outputs the image data in the first data format and the bypass path transmits the image data in the first data format to the storage unit so as to bypass the compression unit and the de-compression unit, and when the operation mode is a general mode, the host outputs the image data in the second data format and the bypass path does not transmit the image data.

39. A drive circuit of a data compression system for a display, for receiving image data having a first data format from a host of the data compression system, the drive circuit comprising:
a bypass path, for transmitting the image data according to an operation mode;
a compression unit, coupled to the host, for receiving the image data and performing a compression procedure on the image data to generate a compression data according to the operation mode;
a storage unit, coupled to the compression unit, for storing the compression data and the image data;
a format conversion unit, coupled to the storage unit, for performing a format conversion procedure to convert the image data into a second data format when receiving the image data which come from the bypass path and bypass the compression unit, and not performing the format conversion procedure when receiving the compression data from the compression unit; and a de-compression unit, coupled to the storage unit, for receiving the compression data and performing a de-compression procedure on the compression data to recover the image data according to the operation mode;

wherein the image data in the second data format has fewer bit numbers than the image data in the first data format;

wherein when the operation mode is a particular mode, the format conversion unit converts the image data from the first data format into the second data format and the bypass path transmits the image data to the storage unit so as to bypass the compression unit and the de-compression unit, and when the operation mode is a general mode, the format conversion unit does not perform the format conversion procedure on the image data and the bypass path does not transmit the image data.

\* \* \* \* \*